United States Patent
Hampson et al.

(10) Patent No.: US 10,216,808 B1
(45) Date of Patent: *Feb. 26, 2019

(54) MULTI SENDER AND SOURCE RECOMMENDATION AGGREGATION AND PROMPTING SYSTEM

(71) Applicant: Google Inc., Mountain View, CA (US)

(72) Inventors: Courtney Hampson, Mountain View, CA (US); Jason Robert Richard Sanio, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,007

(22) Filed: Jul. 10, 2017

Related U.S. Application Data

(63) Continuation of application No. 14/276,558, filed on May 13, 2014, now Pat. No. 9,703,838.

(51) Int. Cl.
  *G06F 17/30* (2006.01)
  *H04L 29/08* (2006.01)

(52) U.S. Cl.
  CPC .......... *G06F 17/3053* (2013.01); *H04L 67/10* (2013.01)

(58) Field of Classification Search
  CPC ................................................ G06F 17/30867
  USPC .................................................. 707/707, 769
  See application file for complete search history.

(56) References Cited

U.S. PATENT DOCUMENTS

| | | | |
|---|---|---|---|
| 6,662,231 B1 | 12/2003 | Drosset et al. | |
| 8,392,505 B2 | 3/2013 | Haughay, Jr. et al. | |
| 9,355,348 B2 | 5/2016 | Guijarro et al. | |
| 2006/0242661 A1 | 10/2006 | Bodlaender et al. | |
| 2007/0247979 A1 | 10/2007 | Brillon et al. | |
| 2007/0299354 A1 | 12/2007 | Striepe et al. | |
| 2008/0133441 A1 | 6/2008 | West et al. | |
| 2008/0147711 A1* | 6/2008 | Spiegelman | G06F 17/3002 |
| 2009/0132453 A1* | 5/2009 | Hangartner | G06F 17/30053 706/46 |
| 2009/0210899 A1 | 8/2009 | Lawrence-Apfelbaum et al. | |
| 2009/0217804 A1 | 9/2009 | Lu et al. | |
| 2009/0265369 A1 | 10/2009 | Hyman et al. | |
| 2010/0088327 A1 | 4/2010 | Holm et al. | |
| 2010/0125882 A1 | 5/2010 | Athias | |
| 2010/0162324 A1 | 6/2010 | Mehta et al. | |
| 2010/0198767 A1 | 8/2010 | Farrelly | |
| 2011/0208616 A1 | 8/2011 | Gorman et al. | |
| 2013/0031162 A1 | 1/2013 | Willis et al. | |
| 2013/0086474 A1 | 4/2013 | Oliver et al. | |
| 2013/0262458 A1 | 10/2013 | Saito et al. | |
| 2014/0025609 A1 | 1/2014 | Coster et al. | |
| 2014/0229894 A1 | 8/2014 | Vinna et al. | |
| 2014/0281977 A1 | 9/2014 | Schupak et al. | |

(Continued)

*Primary Examiner* — Baoquoc N To
(74) *Attorney, Agent, or Firm* — Lowenstein Sandler LLP

(57) ABSTRACT

A method includes receiving a plurality of recommendations for content items from a plurality of sending users for a recipient user through a plurality of sources, determining that the recipient user is interested in viewing a subset of the plurality of recommendations for content items from a first sending user of the plurality of sending users, and generating a first sending user playlist including the subset of the plurality of recommendations for content items from the first sending user but not from other sending users of the plurality of sending users.

20 Claims, 17 Drawing Sheets

(56) References Cited

U.S. PATENT DOCUMENTS

| | | | |
|---|---|---|---|
| 2014/0282772 A1* | 9/2014 | Chen | H04N 21/26258 |
| | | | 725/97 |
| 2014/0358898 A1 | 12/2014 | Lehtiniemi et al. | |
| 2015/0213018 A1 | 7/2015 | Sanio et al. | |

* cited by examiner

USER 1 — PLAYLISTS

Search

| RECOMMENDED ▶ | | | |
|---|---|---|---|
| CONTENT | FROM | SOURCE | CONTENT TYPE |
| Hippo Video | FRIEND 1 | Email | Video |
| Sports Article | FRIEND 2 | Newsfeed | Article |
| Video Game | FRIEND 1 | Wall Post | Game |
| Birthday Card | BROTHER | Text Message | Card |
| TV Show | FATHER | Email | Television |
| Whale Song | COWORKER 1 | Instant Message | Music |
| Training Video | COMPANY 1 | Newsletter | Video |
| Physics Book | MOTHER | Text Message | Book |
| Fish Comic Strip | BROTHER | Social Network Post | Comic |
| C Programming Tip | SUBSCRIPTION | Newsletter | Tip |
| Political Speech | AUTHOR 1 | Blog Post | Speech |
| Product | FRIEND 1 | Comment on Post | Website |
| Restaurant | COWORKER 2 | Voicemail | Food |
| Slide Presentation | COWORKER 1 | Email | Presentation |
| Donation Site | CHARITY | Newsletter | Website |
| Shopping Site | USER 2 | Comment on Post | Website |
| Wedding Pictures | COUSIN 1 | Social Network Message | Image |
| Prank Video | BROTHER | Content Site Share | Video |

FIG. 4B

USER 1 PLAYLISTS

RECOMMENDED ▶

| CONTENT | FROM | SOURCE | CONTENT TYPE | RATING |
|---|---|---|---|---|
| Hippo Video | FRIEND 1 | Email | Video | 5 |
| Sports Article | FRIEND 2 | Newsfeed | Article | 1 |
| Video Game | FRIEND 1 | Wall Post | Game | 4 |
| Birthday Card | BROTHER | Text Message | Card | 4 |
| TV Show | FATHER | Email | Television | 2 |
| Whale Song | COWORKER 1 | Instant Message | Music | 1 |
| Training Video | COMPANY 1 | Newsletter | Video | 1 |
| Physics Book | MOTHER | Text Message | Book | 3 |
| Fish Comic Strip | BROTHER | Social Network Post | Comic | 5 |
| C Programming Tip | SUBSCRIPTION | Newsletter | Tip | 4 |
| Political Speech | AUTHOR 1 | Blog Post | Speech | 3 |
| Product | FRIEND 1 | Comment on Post | Website | 5 |
| Restaurant | COWORKER 2 | Voicemail | Food | 4 |
| Slide Presentation | COWORKER 1 | Email | Presentation | 3 |
| Donation Site | CHARITY | Newsletter | Website | 2 |
| Shopping Site | USER 2 | Comment on Post | Website | 4 |
| Wedding Pictures | COUSIN 1 | Social Network Message | Image | 4 |
| Prank Video | BROTHER | Content Site Share | Video | 5 |

FIG. 4C

USER 1    PLAYLISTS    🔍

Sign out

▶ RECOMMENDED ▶

| CONTENT | FROM | SOURCE | CONTENT TYPE | RATING |
|---|---|---|---|---|
| Hippo Video | FRIEND 1 | Email | Video | 5 |
| Fish Comic Strip | BROTHER | Social Network Post | Comic | 5 |
| Product | FRIEND 1 | Comment on Post | Website | 5 |
| Prank Video | BROTHER | Content Site Share | Video | 5 |
| Video Game | FRIEND 1 | Wall Post | Game | 4 |
| Birthday Card | BROTHER | Text Message | Card | 4 |
| C Programming Tip | SUBSCRIPTION | Newsletter | Tip | 4 |
| Restaurant | COWORKER 2 | Voicemail | Food | 4 |
| Shopping Site | USER 2 | Comment on Post | Website | 4 |
| Wedding Pictures | COUSIN 1 | Social Network Message | Image | 4 |
| Physics Book | MOTHER | Text Message | Book | 3 |
| Political Speech | AUTHOR 1 | Blog Post | Speech | 3 |
| Slide Presentation | COWORKER 1 | Email | Presentation | 3 |
| TV Show | FATHER | Email | Television | 2 |
| Donation Site | CHARITY | Newsletter | Website | 2 |
| Sports Article | FRIEND 2 | Newsfeed | Article | 1 |
| Whale Song | COWORKER 1 | Instant Message | Music | 1 |
| Training Video | COMPANY 1 | Newsletter | Video | 1 |

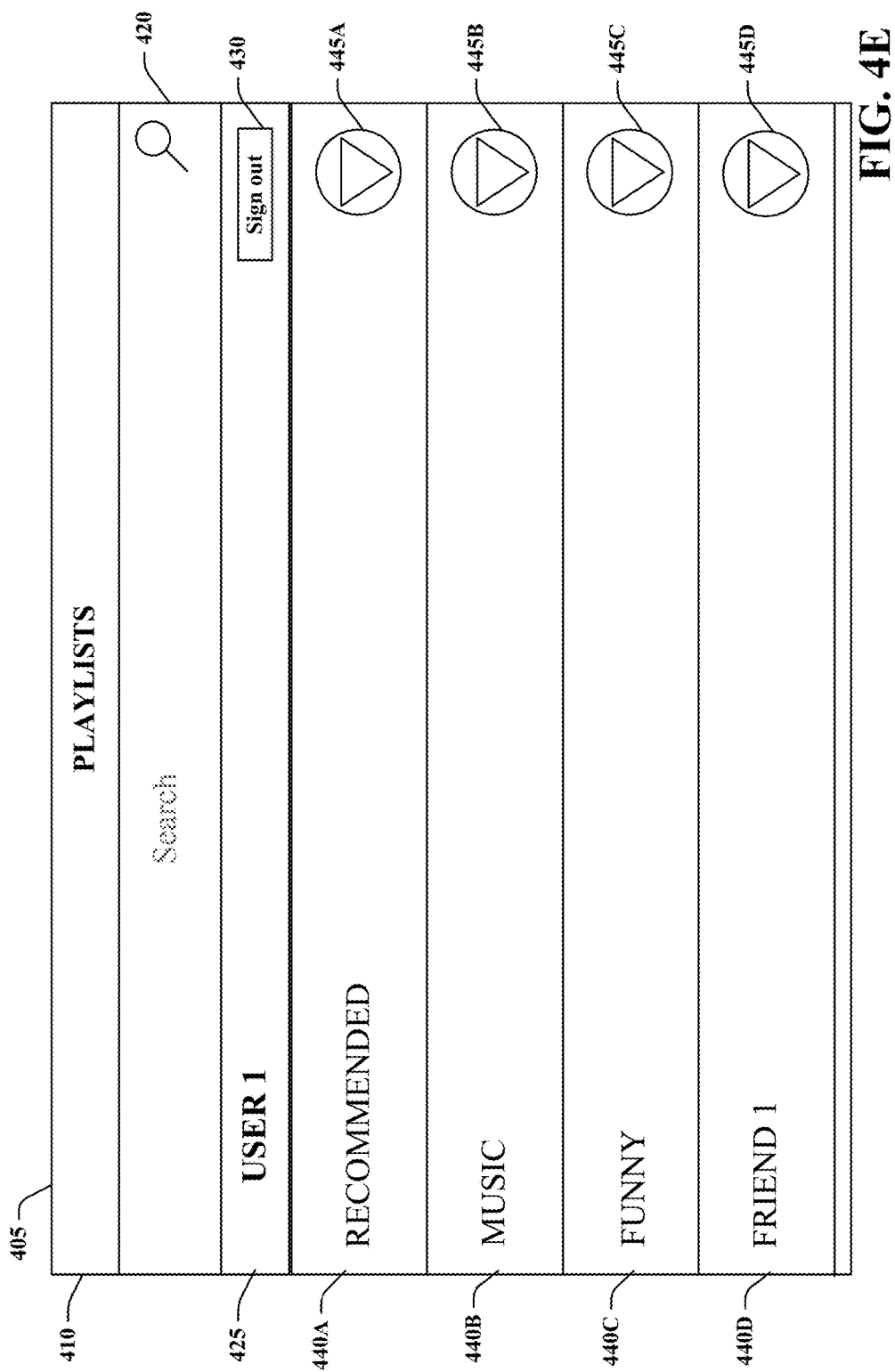

MULTI SENDER AND SOURCE RECOMMENDATION AGGREGATION AND PROMPTING SYSTEM

The present application claims priority from U.S. Non-Provisional patent application Ser. No. 14/276,558, filed 13 May 2014, entitled, "MULTI SENDER AND SOURCE RECOMMENDATION AGGREGATION AND PROMPTING SYSTEM", which is incorporated by reference for all purposes.

TECHNICAL FIELD

This disclosure generally relates to systems and methods that facilitate aggregating received recommendations from a plurality of sources from a plurality of users into a recommendation playlist, and generating additional respective playlists from the recommendation playlist from specific users based upon specified criteria. Additionally, respective feedback is provided to users who provided recommendations on the quality of their recommendations, and based upon specified criteria users are prompted to provide additional recommendations.

BACKGROUND OF THE INVENTION

Content sites allow a wide variety of publishers to publish content for viewing by consumers. In turn, consumers can share recommendations of content to other consumers. As such, a recipient consumer may receive recommendations for content from a plurality of recommender consumers through a plurality of sources (e.g. email, text message, instant message, social network posts, voicemail, subscriptions, blogs, newsletter, comments, content site share, newsfeed, or any other suitable source). Oftentimes, the recipient consumer is not ready to view the recommended content at the time of receiving the recommendation and will look at it later. However, given the quantity of received recommendations and variety of sources from which the recommendations are sent, it can be difficult for a recipient consumer to locate a recommendation at a later time.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a plurality of recommendations for content items from a plurality of sending user personas through a plurality of sources is received in association with a recipient user persona are received in association with the recipient user persona, the plurality of recommendations for content items are added to a received recommendations playlist associated with the recipient user persona, and in response to an interaction criteria, a first sending user persona playlist comprising recommendations for content items from a first sending user persona of the plurality of sending user persona is generated.

In accordance with a non-limiting implementation, an aggregation component is configured to: receive a plurality of recommendations for content items directed to a recipient user persona from a plurality of sending user personas through a plurality of sources, and aggregate the plurality of recommendations for content items into a recommendation playlist associated with the recipient user persona, and a sub-playlist component is configured to, in response to an interaction criteria, dynamically generate a first sending user persona playlist comprising only recommendations for content items from a first sending user persona of the plurality of sending user personas.

In accordance with a non-limiting implementation, feedback from a recipient user persona is received indicating quality of a plurality of recommendations for content items sent by a sending user persona to the recipient user persona, and in response to viewing a content item by the sending user persona and based upon a criteria, presenting, by the system to the sending user persona, a notification to send a recommendation for the content item to the recipient user persona.

In accordance with a non-limiting implementation, a received feedback component is configured to receive feedback from a recipient user persona indicating quality of a plurality of recommendations for content items sent by a sending user persona to the recipient user persona, and a content analysis component is configured to, in response to viewing a content item by the sending user persona and based upon a criteria, prompt the sending user persona to send a recommendation for the content item to the recipient user persona These and other implementations and embodiments are described in more detail below.

BRIEF DESCRIPTION OF THE DRAWINGS

FIG. 4B illustrates a non-limiting example user interface for presenting received recommendations and playlists in accordance with an implementation of this disclosure.

FIG. 4C illustrates a non-limiting example user interface for presenting received recommendations with ratings and playlists in accordance with an implementation of this disclosure.

FIG. 4D illustrates a non-limiting example user interface where the received recommendations in the recommendation playlist have been sorted by rating in accordance with an implementation of this disclosure.

FIG. 4E illustrates a non-limiting example user interface where a playlist has been created with recommendations from particular sending user persona in accordance with an implementation of this disclosure.

DETAILED DESCRIPTION

Overview

Figure 1:
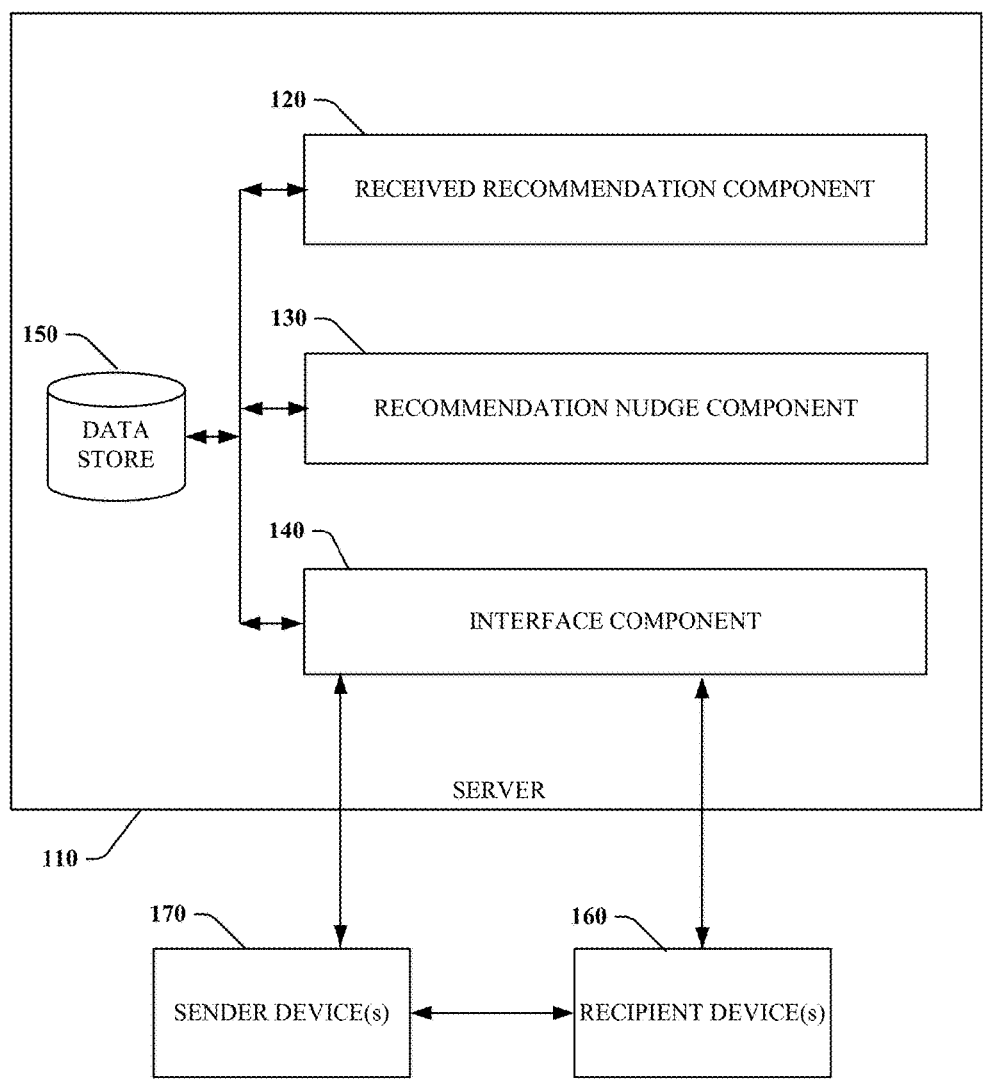
FIG. 1 illustrates a block diagram of an exemplary non-limiting example system receiving a plurality of recommendations for content directed to a recipient user persona from a plurality of sending user personas from a plurality of sources, and aggregating the recommendations into a playlist(s) for the recipient user persona, as well as prompting a sending user persona to send recommendations to recipient user personas in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which systems and methods described herein collect personal information about users, or may make use of personal information, the users can be provided with an opportunity to control whether programs or features collect user information (e.g., information about a user's social network, social actions or activities, profession, a user's preferences, or a user's current location), or to control whether or how to receive content from a content server that may be more relevant to the user. In addition, certain data can be treated in one or more ways before stored or used, so that personally identifiable information is removed. For example, a user's identity can be treated so that no personally identifiable information can be determined for the user, or a user's geographic location can be generalized where location information is obtained (e.g., such as to a city, ZIP code, or state level), so that a particular location of a user cannot be determined. The user can add, delete, or modify information about the user. Thus, the user can control how information is collected about her and used by a server.

In accordance with various disclosed aspects, a mechanism is provided for receiving a plurality of recommendations for content directed to a recipient user persona from a plurality of sending user personas from a plurality of sources, and aggregating the recommendations into a playlist for the recipient user persona. For example, a recipient user persona can receive recommendations from sending user personas, such as, friends, coworkers, family, unknown users (e.g. users they don't know or don't have an established relationship), companies, organizations, groups, authors, or any other suitable user that can provide a recommendation for content to view (e.g. play, watch, listen, read, use, test, print, access, download, save, smell, taste, feel, or any other suitable mechanism in which to interact with content). The recommendations can be aggregated into a playlist (e.g. recommendation playlist) where the recipient user persona can easily view, search, filter, sort, save, delete, and rate recommendations. Moreover, the mechanism can generate a playlist of recommendations from a particular sending user persona or set of sending user personas based upon specified criteria. For example, a friend may provide recommendations that the recipient user persona frequently views or rates highly. The system can generate a playlist of recommendations from that friend. Additionally, the mechanism can provide feedback to the plurality of sending user personas on the quality of their recommendations from the perspective of the recipient user personas. For example, a rating that a recipient user persona applied to a recommendation can be fed back to the sending user persona that sent the recommendation.

Furthermore, a mechanism is provided to prompt a user persona to send recommendations to other user personas, such as based upon feedback on the quality of their recommendations. For example, a user watching a video can be prompted at the end of the video to recommend the video to friends that have rated the user's recommendations highly and/or have similar interests.

It is to be appreciated that a user persona is any digital identifier representing user that can provide a recommendation to or receive a recommendation from another user persona, such as in a non-limiting example, an email address, phone number, name, alias, username, user profile, handle, identification number, pseudonym, internet protocol address, uniform resource locator, domain name, or any other suitable mechanism for identifying a user digitally. It is further to be appreciated that a user can be a person, company, school, institution, government, charity, club, organization, group, or any other suitable entity capable of generating or receiving a recommendation for content to view.

It is also to be appreciated that concepts herein are applicable to any suitable type of content (e.g. content item) including, in a non-limiting example, video, audio, image, text, music, sounds, speeches, statements, cartoons, short films, movies, televisions shows, documents, books, scripts, magazines, articles, novels, quotes, poems, comics, advertisements, photos, posters, prints, paintings, drawings, artwork, graphics, games, applications, products, websites, newsletters, smells, tastes, textures, objects, tools, utilities, presentations, locations, destinations, channels, broadcast, any other suitable type of creative work, or any suitable combination thereof.

Additionally, it should be understood that the source through which the recommendation is conveyed from a sending user persona to a recipient user persona can be any suitable communication mechanism, non-limiting examples of which include, email, text message, instant message, chat message, wall post, social network post, social network message, voicemail, video message, audio message, photo message, comment on a post, blog post, newsletter, pop-up window, content site share, phone call, conference call, optical character recognition of a handwritten or printed note, voice recognition of a live or recorded conversation, Near Field Communication (NFC), Bluetooth communication, Bump (e.g. sharing through bumping sender device with recipient device), cloud drive share, shared playlist, or any other suitable mechanism where a recommendation can be conveyed from the sending user persona to the recipient user persona.

Referring now to the drawings, FIG. 1 depicts a system 100 for receiving a plurality of recommendations for content directed to a recipient user persona from a plurality of sending user personas from a plurality of sources, and aggregating the recommendations into a playlist(s) for the recipient user persona, as well as prompting a sending user persona to send recommendations to recipient user personas. System 100 includes server 110 that includes received recommendation component 120 that receives a plurality of recommendations directed to a recipient user persona from a plurality of sending user personas from a plurality of sources, aggregates the recommendations into one or more playlists for the recipient user persona, and provides feedback to sending user personas. Server 110 also includes recommendation nudge component 130 that provides feedback to the plurality of sending user personas on the quality of their recommendations from the perspective of the recipient user personas, and prompts the sending user personas to send recommendations to recipient user personas. Server 110 also includes interface component 140 that interacts with recipient device(s) 160 and sender device(s) 170 to facilitate exchange of data. Recipient devices are employed by recipient user personas and sender devices are employed by sending user personas. It is to be appreciated that recipient devices can be the same or different device from the sender devices. Additionally, server 110 includes a data store 150 that can store content and data generated and/or received by server 110, received recommendation component 120, recommendation nudge component 130, and interface component 140. Data store 150 can be stored on any suitable type of storage device, non-limiting examples of which are illustrated with reference to FIGS. 11 and 12.

Figure 12:
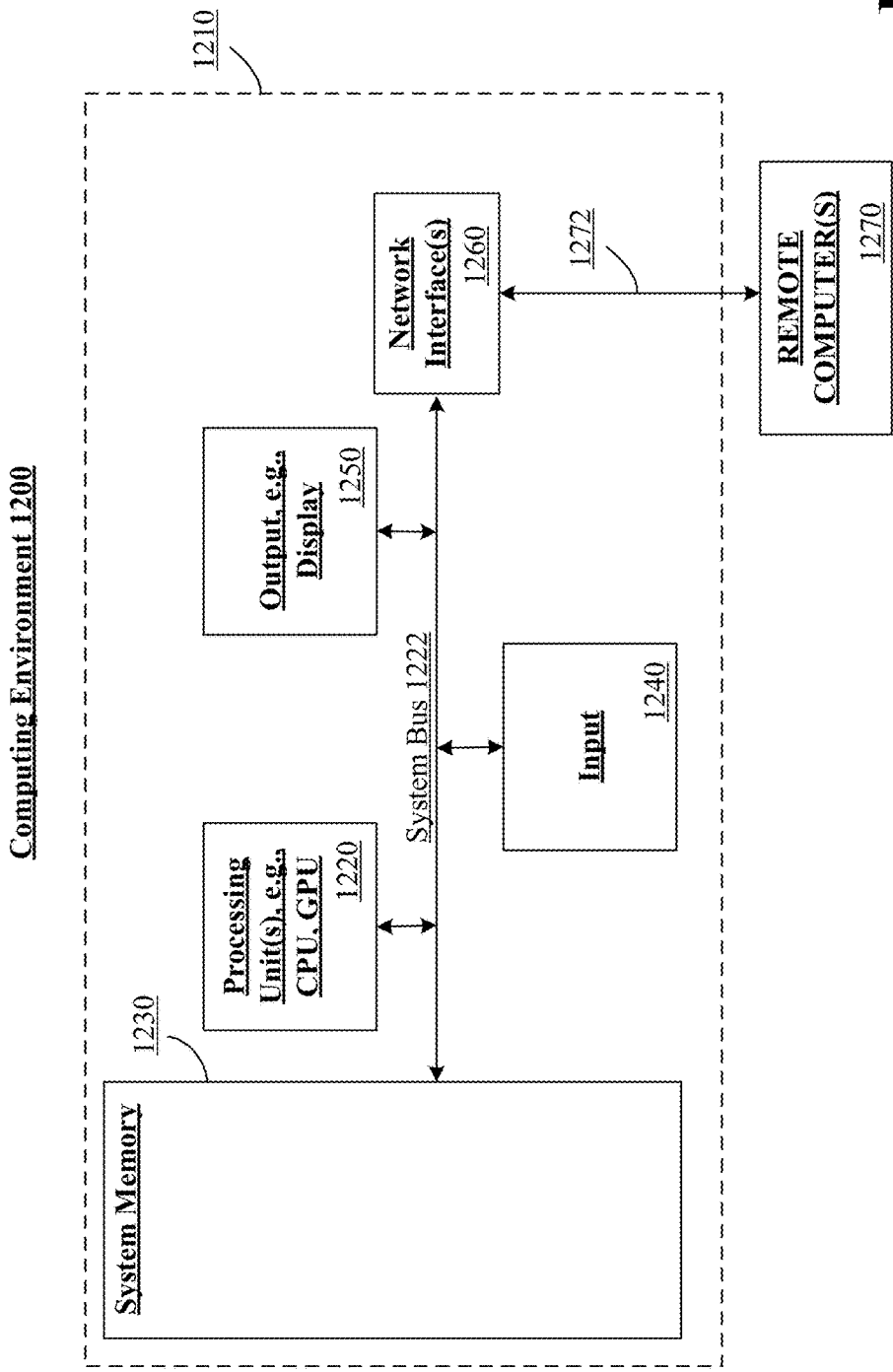
FIG. 12 illustrates a block diagram of an exemplary non-limiting computing system or operating environment in which various embodiments can be implemented.

Server 110, recipient device 160, and sender device 170 include at least one memory that stores computer executable components and at least one processor that executes the computer executable components stored in the memory, a non-limiting example of which can be found with reference to FIG. 12. Server 110 can communicate via a wired and/or wireless network with recipient device 160 and/or sender device 170. Furthermore, Server 110 can communicate with any suitable number of recipient devices 160 and sender devices 170, recipient device 160 can communicate with any suitable number of servers 110 and sender devices 170, and sender device 170 can communicate with any suitable number of servers 110 and recipient devices 160.

Server 110, recipient device 160, and sender device 170 can be any suitable type of device for recording, interacting with, receiving, accessing, or supplying data locally, or remotely over a wired or wireless communication link, non-limiting examples of which include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording, interacting with, receiving, accessing, or supplying data that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, Blu-ray device, DVD (digital versatile disc or digital video disc) device, compact disc device, video game system, portable video game console, audio/video receiver, radio device, portable music player, navigation system, car stereo, sensor, or any other suitable device capable of recording, interacting with, receiving, accessing, or supplying data. Moreover, server 110, recipient device 160, and sender device 170 can include a user interface (e.g., a web browser or application), that can receive and present displays and data generated locally or remotely.

Figure 2:
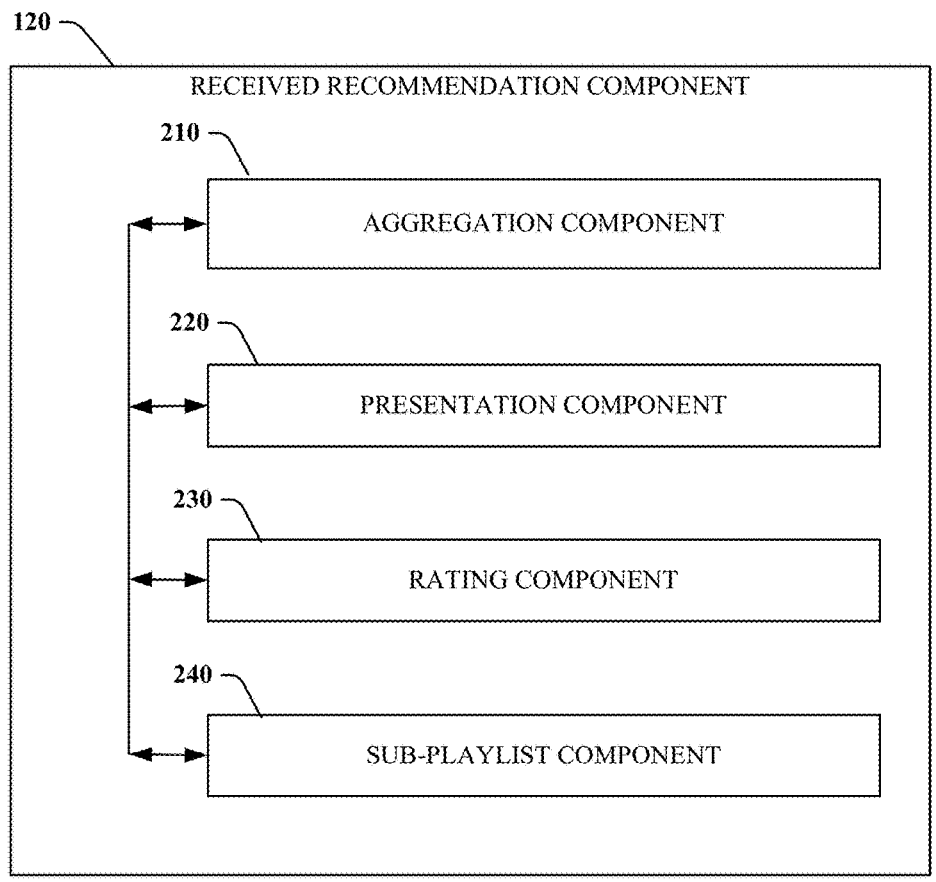
FIG. 2 illustrates a block diagram of an exemplary non-limiting received recommendation component that receives a plurality of recommendations directed to a recipient user persona from a plurality of sending user personas from a plurality of sources, aggregates the recommendations into one or more playlists for the recipient user persona, and provides feedback to sending user personas in accordance with an implementation of this disclosure.

FIG. 2 illustrates received recommendation component 120 that includes aggregation component 210 that determine, identifies, or infers a plurality of recommendations for content directed to a recipient user persona from a plurality of sending user personas from a plurality of sources, and aggregates the recommendations into a playlist(s) for the recipient user persona. For example, aggregation component 210 can continually or periodically (e.g. at regular or irregular intervals) examine a plurality of potential sources of recommendations associated with a recipient user persona to identify recommendations directed to the recipient user persona and create a recommendation playlist that contains all of the identified recommendations. It is to be appreciated that recommendations can be explicitly identified as a recommendation from a sending user persona, such as in a non-limiting example, a share in a content sharing site. In other cases, aggregation component 210 can determine or infer recommendations implicitly. For example, a recipient user persona may have an email account, an instant message account, a text message account, a social network account, a voicemail account, a wearable device, and a subscription to a newsletter. Aggregation component 210 can examine messages in the email account, instant message account, or text message account using any suitable algorithm to identify recommendations for content contained within the messages. For example, text in the message can be interpreted to identify language indicative of a recommendation such as, in a non-limiting example, "Check this out", "You'll like this", "You should get this", "This may help", "I found this useful", "Have you seen this", "What do you think of this", or any other suitable language indicative of a recommendation. In another example, recipient user persona can label a message as a recommendation or place messages containing recommendations in a specific folder, which aggregation component 210 can access for recommendations. In an additional example, aggregation component 210, can examine a link or attachment included in a message to infer whether the content at the link or in the attachment is a recommendation.

Continuing with the example, aggregation component 210 can examine messages, posts, comments, links, or attachments in the social network account using any suitable algorithm to explicitly or implicitly determine, identify, or infer recommendations for content contained within the messages, posts, comments, links, or attachments. Aggregation component 210 can also employ voice recognition (e.g. speech to text conversion) on the voicemails in the voicemail account to identify speech and/or tone indicative of a recommendation. Aggregation component 210 can also examine data (e.g. audio recording, video recording, or image capture) obtained through a wearable device, such as voice recognition of a live recording of a conversation or optical character recognition of an image captured of a handwritten or printed document to identify a recommendation. Additionally, aggregation component 210 can examine a newsletter received from the subscription to identify recommendations contained within the newsletter. It is to be appreciated that aggregation component can employ any suitable mechanism or algorithm to explicitly or implicitly identify recommendations in data contained within any source associated with a recipient user persona. Furthermore, a recipient user persona can specify which of his associated sources are or are not to be employed by aggregation component 210. Aggregation component 210 can also limit a timeframe of data from the sources to examine, such as based upon any suitable predetermined, dynamically determined, or user specified time threshold. For example, a user can specify to have aggregation component 210 only look for recommendations within the past three months. Additionally, aggregation component 210 can add recommendations to a playlist as they are determined, identified, or inferred. In addition, aggregation component can also remove recommendations from a playlist based upon any suitable predetermined, dynamically determined, or user specified removal criteria, such as in a non-limiting example, age of recommendation, recommendation rating, sending user persona weight, delete command, source, content type, or any other suitable removal criteria.

Aggregation component 210 can store any suitable information about recommendations in an appropriate data structure. For example, aggregation component 210 can store links to the recommendations in a data store. In another example, aggregation component 210 can store the recommendations themselves in a data store. In another example, aggregation component 210 can extract portions of the recommendations to store in a data store, such as in a non-limiting example, the content, link to the content, sending user recipient identifier, source identifier, content type identifier, time recommendation was received, metadata associated with the content, or any other suitable data associated with a recommendation.

Figure 4A:
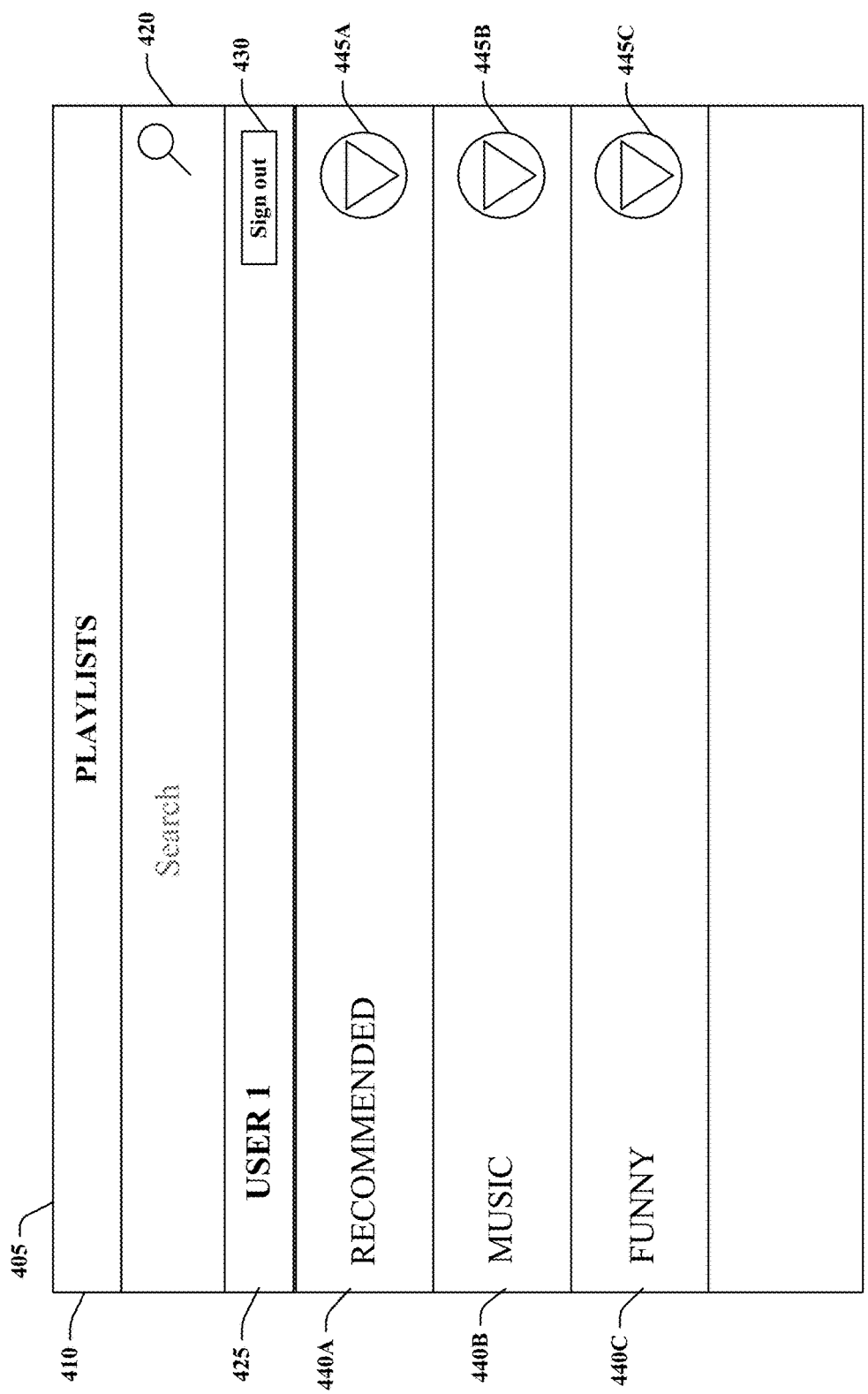
FIG. 4A illustrates a non-limiting example user interface for presenting playlists in accordance with an implementation of this disclosure.

Received recommendation component 120 also includes presentation component 220 that allows a recipient user persona to view his playlist(s). Referring to FIG. 4A, a non-limiting example user interface 405, such as on a recipient device 160, is illustrated presented by presentation component 220. User interface 405 includes a title area 410 that indicates the application or website currently active or in the foreground of the user interface, which in this example is "PLAYLISTS" representing an application for interacting with playlists. Furthermore, user interface 405 includes a user area 425 that indicates the current user signed into the video application, which in this example is "USER 1", and that also provides a sign-out selection element 430 for the user to sign out of the application. User interface 405 also includes a search area 420 that allows for entering a search within the functional area of the application, such as to search for playlists. In this example, "RECOMMENDED" 440A, "MUSIC" 440B, and "FUNNY" 440C playlists are depicted along with respective selection elements 445A-C to allow a user to select an action to perform with the associated playlist, for example, by a menu that is activated upon selection of selection elements 445A-C. It is to be appreciated that while only three playlists are depicted, any number of playlists can be included. Furthermore, navigation elements can be included for navigating the list of playlists, non-limiting examples of which include a scrolling element or touchscreen swipe gesture navigation. Actions can include, but are not limited to, accessing the playlist, playing the playlist, editing the playlist, deleting the playlist, sharing the playlist, duplicating the playlist, or any other suitable action that can be performed on a playlist. User interface 405 can also include a new playlist selection element (not shown) that presents a playlist editor for creating a new playlist.

Referring to FIG. 4B, a non-limiting example user interface 405 is depicted where "USER 1" has selected "RECOMMENDED" 440A playlist to access. User interface 405 further includes a playlist selection menu 450 that allows for selection of a playlist, this example depicting "RECOMMENDED" associated with "RECOMMENDED" 440A playlist. For example, playlist selection menu 450 can be a drop down menu that includes a list of the playlists previously created. In addition, playlist selection menu 450 can include a selectable entry for creating a new playlist. User interface 405 also includes a playlist area 452 that shows content that is currently in the playlist selected in playlist selection menu 450. In this non-limiting example, playlist area 452 shows "Hippo Video . . . Prank Video" currently in "RECOMMENDED" 440A playlist. Column 454 indicates the recommended content in each row of the playlist. Column 456 indicates the sending user persona for the recommended content in each row of the playlist. Column 458 indicates the source associated with recipient user persona for the recommended content in each row of the playlist. Column 460 indicates the type of content for the recommended content in each row of the playlist. It is to be appreciated columns 454, 456, 458, and 460 are non-limiting examples of metadata associated with recommended content, and that any suitable metadata associated with the recommended content can be shown with the recommended content in playlist area 452.

Furthermore, user interface 405 can have controls (not shown) that allow recipient user persona to sort and filter the recommended content. For example, columns 454, 456, 458, and 460 can have controls (not shown) that allow recipient user persona to select one or more columns, and specify order, and ascending/descending for sorting the recommended content. In another example, user interface 405 can have controls (not shown) that allow a recipient user persona to specify recommendations with certain content, sending user personas, sources, or content types to include or exclude from the displayed playlist. Any suitable controls for sorting and filtering can be employed by user interface 405. Furthermore, user interface 405 can be configured, organized, or displayed in any suitable manner for presenting playlists based upon pre-determined, dynamically determined, or user specified criteria.

Figure 3:
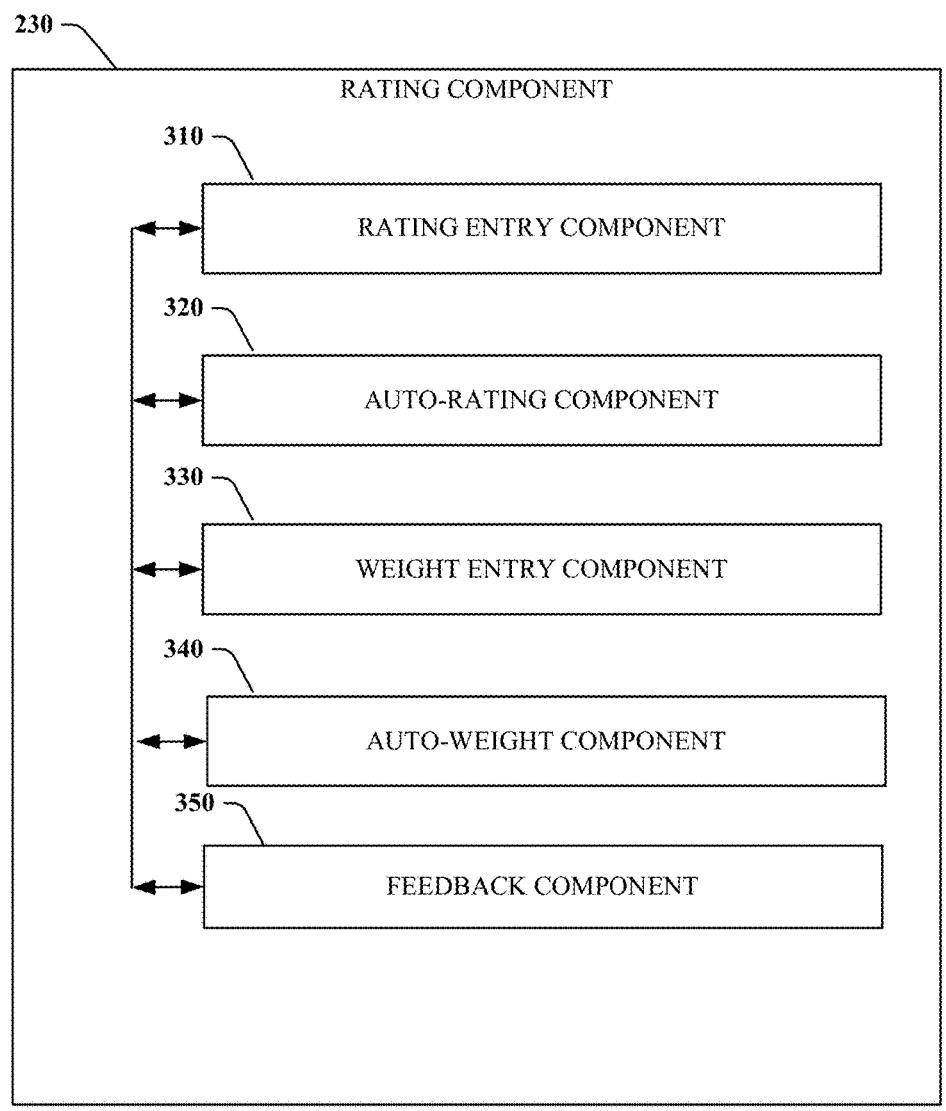
FIG. 3 illustrates a block diagram of an exemplary non-limiting rating component that allows for assigning respective ratings to recommendations indicative of the quality of the recommendations and respective weights to sending user personas indicative of the quality of their recommendations, and provides feedback to the sending user personas in accordance with an implementation of this disclosure.

Referring back to FIG. 2, received recommendation component 120 also includes rating component 230 that allows for assigning respective ratings to recommendations indicative of the quality of the recommendations and respective weights to sending user personas indicative of the quality of their recommendations, and provides feedback to the sending user personas. Referring to FIG. 4C, a non-limiting example user interface 405 is depicted where ratings have been assigned to the recommended content in "RECOMMENDED" 440A playlist. Referring to FIG. 3, rating component 230 includes rating entry component 310 that allows a recipient user persona to assign respective ratings to recommended content, such as in a non-limiting example, using a rating entry element (not shown) in user interface 405. For example, "USER 1" can select the rating column for "Hippo Video" in user interface 405 and enter the rating "5". It is to be appreciated that rating entry component 310 can employ any suitable mechanism to enable a recipient user persona to assign a rating to a recommendation.

Rating component 230 includes auto-rating component 320 that can automatically assign a rating to a recommendation. For example, auto-rating component 320 can monitor a recipient user persona's interaction with a recommendation to assign a rating. In a non-limiting example, if a recipient user persona takes a positive interaction with the content associated with a recommendation, such as views the content, shares the recommendation with another user persona, saves the content for later viewing, comments positively on the content, indicates a like of the content, or takes any other suitable action indicative of a positive interaction with the recommendation, auto-rating component 320 can assign a higher rating to the recommendation according a degree of positive interaction with the recommendation. For example, if the recipient user persona viewed the entire content can indicate a more positive interaction versus viewed only a portion of the content. In another example, if the recipient user persona viewed the entire content and shared the recommendation can indicate a more positive interaction versus just viewing the entire content. Auto-rating component 320 can factor quantity and types of positive interactions in determining the degree of positive interaction. Auto-rating component 320 can also factor negative interaction by a recipient user persona with a recommendation to assign a lower rating to the recommendation according to a degree of negative interaction with the recommendation. For example, a recipient user persona can take a negative interaction with the content associated with a recommendation, such as views the content for a short time, views only a portion of the content, does not view the content, deletes the recommendation, comments negatively on the content, flags the content as offensive, or takes any other suitable action indicative of a negative interaction with the recommendation. Auto-rating component 320 can factor quantity and types of negative interactions in determining the degree of negative interaction. Auto-rating component 320 can also factor degrees of positive and negative interaction in assigning a rating to a recommendation. It is to be appreciated that auto-rating component 320 can employ any suitable pre-defined, dynamically determined, or user specified criteria using any suitable formula, function, or algorithm to assign a rating to a recommendation.

Rating component 230 includes weight entry component 330 that allows a recipient user persona to assign a weight to a sending user persona indicative of the quality of recommendations from the sending user persona. For example, weight entry component 330 can allows a recipient user persona to assign respective weights to sending user personas, such as in a non-limiting example, a weight entry element (not shown) in user interface 405. It is to be appreciated that weight entry component 330 can employ any suitable mechanism to enable a recipient user persona to assign a weight to a sending user persona.

Rating component 230 also includes auto-weight component 340 that can automatically assign a weight to a sending user persona. For example, auto-weight component 340 can monitor a recipient user persona's interaction with recommendations from a sending user persona to assign a weight to a sending user persona. In a non-limiting example, if a recipient user persona has more positive interactions with the content associated with recommendations from a sending user persona, auto-weight component 340 can assign a higher weight to the sending user persona according a degree of positive interactions. If a recipient user persona has more negative interactions with the content associated with recommendations from a sending user persona, auto-weight component 340 can assign a lower weight to the sending user persona according a degree of negative interactions. Auto-weight component 340 can also factor degrees of positive and negative interaction in assigning a weight to a sending user persona. In addition, auto-weight component 340 can also employ other any suitable criteria, such as in a non-limiting example, time since last recommendation from the sending user persona, frequency of recommendations from the sending user persona, or relationship between recipient user persona and sending user persona in assigning a weight to a sending user persona. It is to be appreciated that auto-weight component 340 can employ any suitable pre-defined, dynamically determined, or user specified criteria using any suitable formula, function, or algorithm to assign a weight to a sending user persona.

Rating component 230 also includes feedback component 350 that can send feedback from a recipient user persona to a sending user persona indicative of the quality of his recommendations. It is to be appreciated that the feedback can include the direct ratings assigned to their recommendations and/or the weight assigned to the sending user persona, or a feedback value(s) indicative of the ratings and/or weight. For example, a feedback value may normalize the ratings and/or weight across a plurality of sending user personas. In another example, a feedback value may be a binary indication of "GOOD" or "BAD". It is to be appreciated that feedback component 350 can employ any suitable pre-defined, dynamically determined, or user specified criteria using any suitable formula, function, or algorithm to generate a feedback value. The sending user persona can employ the feedback to improve their recommendations. In another example, feedback component 250 doesn't send the feedback to the sending user persona, and instead makes the feedback available to recommendation nudge component 130 (described in more detail below). In a further example, feedback component 250 sends the feedback to the sending user persona and makes the feedback available to recommendation nudge component 130.

Referring back to FIG. 2, presentation component 220 can employ ratings on recommendation and weights on sending user personas, or any other suitable criteria when presenting playlists of recommendations to a recipient user persona, such to automatically filter or sort playlists and/or recommendations in playlists. Referring to FIG. 4D, a non-limiting example user interface 405 is depicted where the recommendations in the recommendation playlist have been automatically sorted by presentation component 220 by rating.

Furthermore, presentation component 220 can select and present particular recommendations and/or playlists to a recipient user persona based upon a current context (e.g. activity, location, type of recipient device, capabilities of recipient device, connection speed of recipient device, type of vehicle being used, who is nearby, school, work, home, shopping, ambient sound, ambient light, weather, inferred mood, or any other suitable attribute descriptive of context) of the recipient user persona. For example, a recipient user persona driving a car can be presented recommendations for audio content through their car radio. In another example, a recipient user persona at work can be presented recommendations from coworkers. In a further example, a recipient user persona in a crowd of noise people can be presented recommendations for content that do not require audio. In an additional example, a recipient user persona passing near a store can be presented recommendations for products carried by the store.

Received recommendation component 120 also includes sub-playlist component 240 that can automatically create specific playlists from the recommendations in the recommendation playlist that contains all of the identified recommendations for a recipient user persona, such as based upon any suitable criteria associated with sending user personas, recipient user persons, or recommendations from sending user personas. For example, sub-playlist component 240 can create a specific playlist containing recommendations from a specific sending user persona when the quantity of recommendations from the sending user persona exceeds a threshold quantity. In another example, sub-playlist component 240 can create a specific playlist containing all recommendations exceeding a threshold rating. In an additional example, sub-playlist component 240 can create a specific playlist containing all recommendations from a particular source and exceeding a threshold rating. In a further example, sub-playlist component 240 can create a specific playlist containing all recommendations from sending user personas having weights exceeding a threshold weight. In another example, sub-playlist component 240 can create a specific playlist containing all recommendations from a sending user personas having ratings exceeding a threshold rating and within a specified timeframe. It is to be appreciated that sub-playlist component 240 can create a specific playlist based upon any suitable combination of criteria. Furthermore, sub-playlist component 240 can monitor creation of playlists by a recipient user persona to learn, using any suitable learning algorithm, her preferences for playlists and automatically create playlists for the recipient user persona based upon the learning.

Referring to FIG. 4E, is illustrated a non-limiting example user interface 405 where sub-playlist component has created "FRIEND 1" playlist 440D with recommendations from "FRIEND 1", along with respective selection element 445D to allow a user to select an action to perform with the associated playlist.

Figure 5:
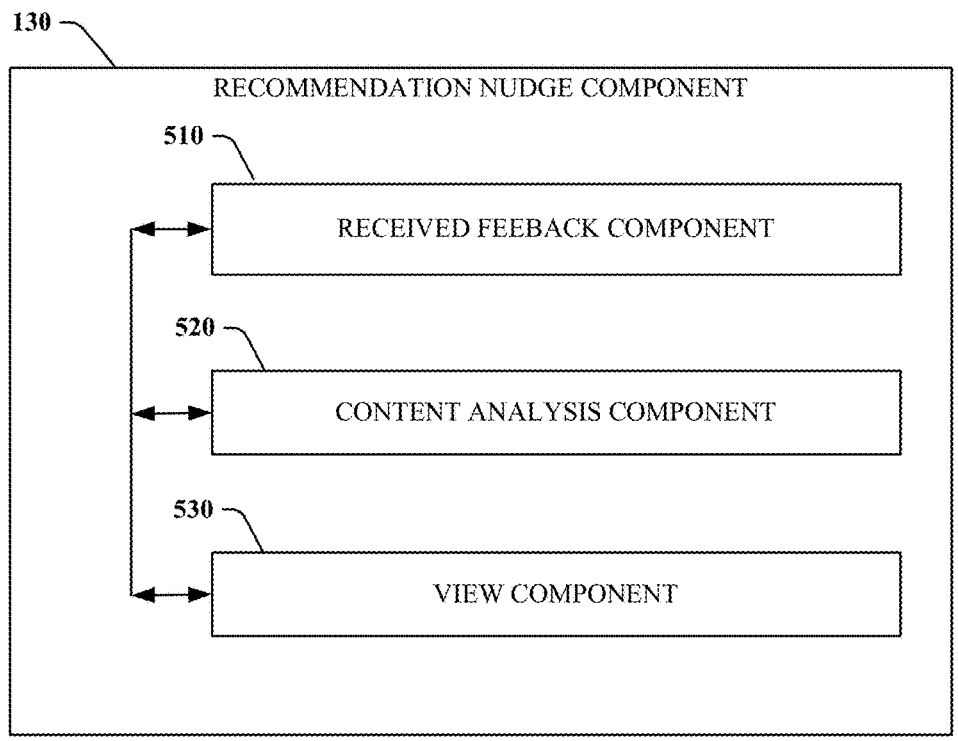
FIG. 5 illustrates a block diagram of an exemplary non-limiting recommendation nudge component that provides receives feedback for the plurality of sending user personas on the quality of their recommendations from the perspective of the recipient user personas, and prompts the sending user personas to send recommendations to recipient user personas in accordance with an implementation of this disclosure.

Referring to FIG. 5, recommendation nudge component 130 is illustrated including received feedback component 510 that receives respective feedback from recipient user personas to a sending user persona indicative of the quality of her recommendations. It is to be appreciated that received feedback component 510 can store the respective feedback in an appropriate data structure, such as linked to corresponding sent recommendations from the sending user persona.

Recommendation nudge component 130 also includes content analysis component 520 that analyzes content currently being viewed or previously viewed by a sending user persona to identify opportunities to prompt (e.g. nudge) the sending user persona to provide a recommendation to a recipient user persona. For example, content analysis component 520 can identify attributes of a content item currently being viewed by a sending user persona that are similar to a content item recommended by the sending user persona to a recipient user person who rated the content item highly, and prompt the sending user persona to recommend the content item currently being viewed to the recipient user persona.

In another example, content analysis component 520 can review content items previously viewed by the sending user persona and prompt the sending user persona to recommend the one or more of the content items to one or more recipient user personas whose feedback indicates that the sending user persona provides good recommendations. It is to be appreciated that content analysis component 520 can select content items that would be of interest to a recipient user persona based upon ratings provided by the recipient user persona, demographics of the recipient user persona, relationships between the recipient user persona and the sending user persona, interests profile of the recipient user profile, or any other suitable criteria indicative of interest in a content item by the recipient user persona. In a further example, content analysis component 520 can warn, using any suitable audio, visual, or physical alert, a sending user persona who is about to send a recommendation for a content item to a recipient user person not to send the recommendation based upon analysis of feedback and/or other criteria associated with the recipient user persona that indicates the recipient would not be interested in the content item. It is to be appreciated that content analysis component 520 can employ any suitable criteria to prompt a sending user persona to send a recommendation for a content item to a recipient user persona, or warn a sending user persona not to send a recommendation for a content item to a recipient user persona.

Figure 6A:
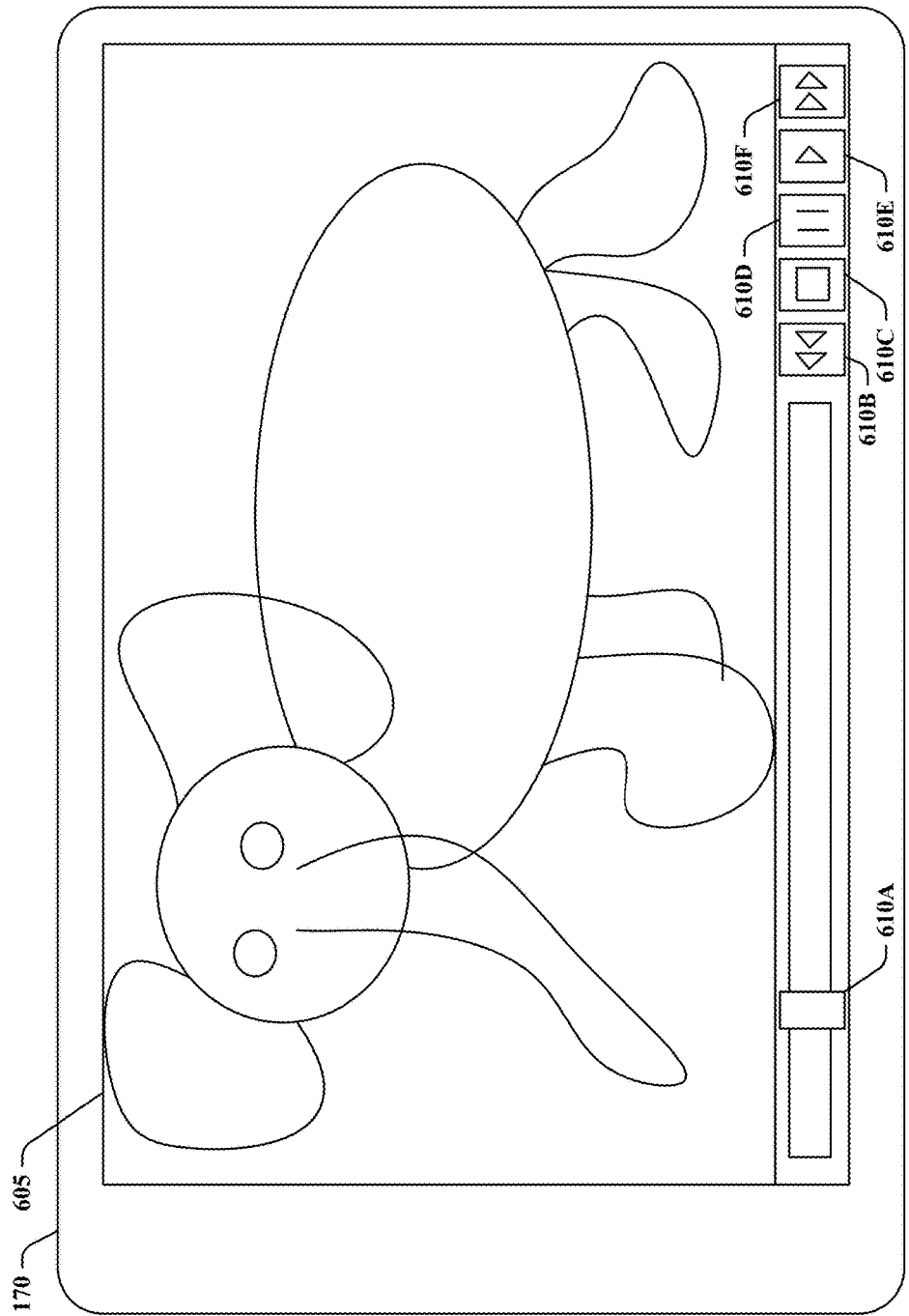
FIG. 6A illustrates a non-limiting example recipient device with a user interface playing content for a sending user persona in accordance with an implementation of this disclosure.

Referring to FIG. 6A is illustrated a non-limiting example sender device 170 with a user interface 605 playing content for a sending user persona, in this example, and "ELEPHANT VIDEO". Optionally, playback controls appropriate for the content can be presented. In this example, slider control 610A is shown that allows for selection of point of playback of the video content depicted. In addition, rewind control 610B, stop control 610C, pause control 610D, play control 610E, fast forward control 610F are depicted.

Figure 6B:
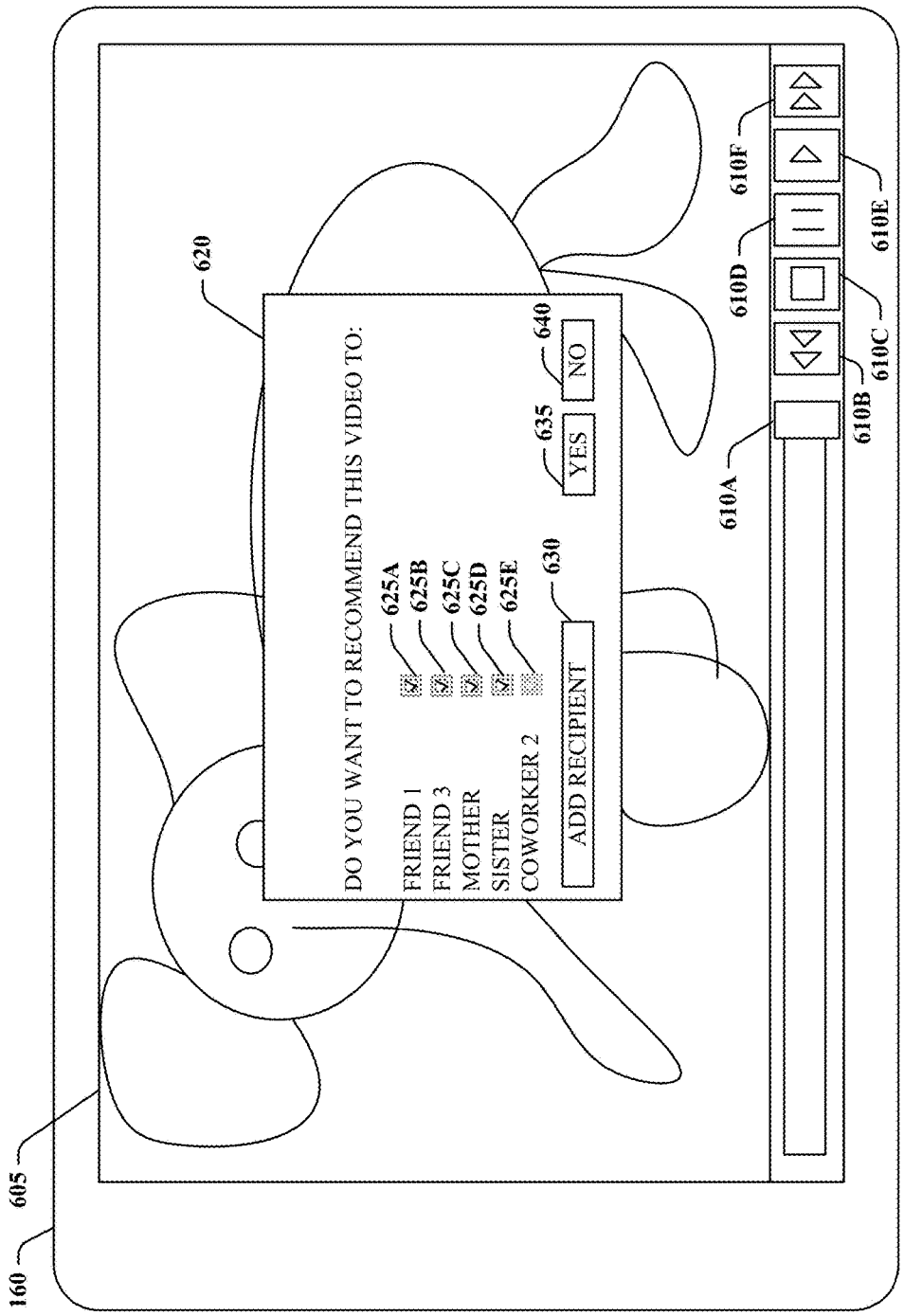
FIG. 6B illustrates a non-limiting example recipient device with a user interface playing the content for a sending user persona where the video has reached the end and a prompt is displayed to nudge the sending user persona to send a recommendation for the content to recipient user personas in accordance with an implementation of this disclosure.

Referring to FIG. 6B is illustrated a non-limiting example sender device 170 with a user interface 605 playing the content for the sending user persona where the video has reached the end and a prompt 620 is displayed to nudge the sending user persona to send a recommendation for the content to recipient user personas, "FRIEND 1", "FRIEND 3", "MOTHER", "SISTER", and "COWORKER". The recipient user personas, have selection elements 625A, 625B, 625C, 625D, and 625E that allow the sending user persona to select or deselect recipient user personas for sending the recommendation. In a non-limiting example, content analysis component 520 can select recipient user personas for which to send a recommendation for the content and display them in the prompt. The sending user persona can then deselect recipient user personas to exclude from sending the recommendation. Furthermore, prompt 620 has add recipient element 630 that allows sending user persona to add one or more additional recipient user personas for sending the recommendation. Prompt 620 also include yes element 635 which sending user persona can select to send the recommendation to the selected recipient user personas, and no element 640 sending user persona can select to declines sending the recommendation to any recipient user personas. It is to be appreciated that content analysis component 520 can employ any suitable user interface or mechanism to prompt a sending user persona to send a recommendation to a recipient user persona.

Figure 7:
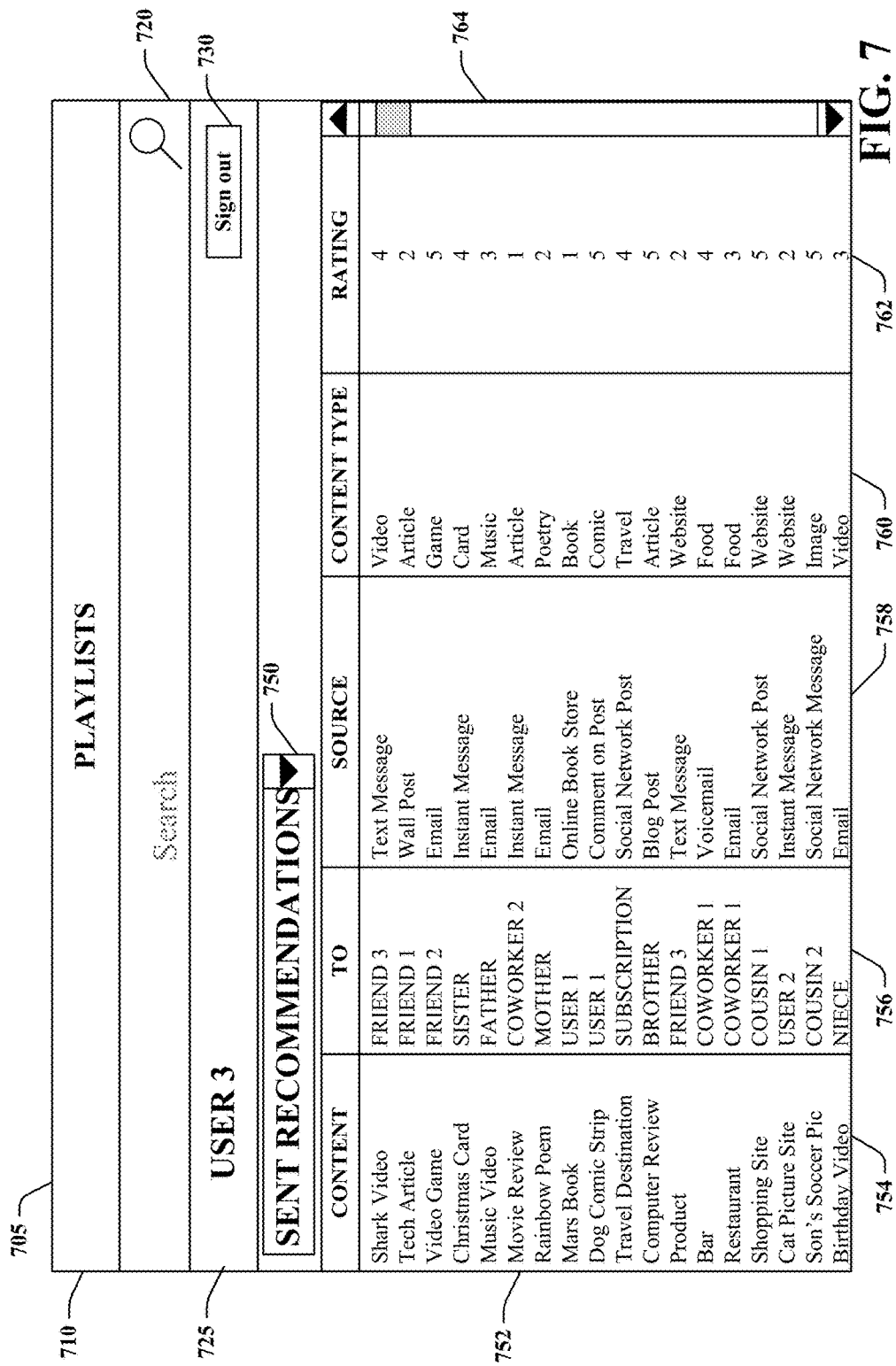
FIG. 7 illustrates a non-limiting example user interface for presenting sent recommendations and playlists in accordance with an implementation of this disclosure.

Referring back to FIG. 5, recommendation nudge component 130 also includes view component 530 that allows a sending user persona to view recommendations that he has sent to recipient user personas. For example, recommendation nudge component can aggregate recommendations for a plurality of content that sending user persona has sent to a plurality of recipient user personas through a plurality of sources into a recommended playlist. Referring to FIG. 7, a non-limiting example user interface 705 is depicted where "USER 3" has selected "SENT RECOMMENDATIONS" playlist to access. User interface 705 includes a title area 710 that indicates the application or website currently active or in the foreground of the user interface, which in this example is "PLAYLISTS" representing an application for interacting with playlists. Furthermore, user interface 705 includes a user area 725 that indicates the current user signed into the video application, which in this example is "USER 3", and that also provides a sign-out selection element 730 for the user to sign out of the application. User interface 705 also includes a search area 720 that allows for entering a search within the functional area of the application, such to search for playlists.

User interface 705 further includes a playlist selection menu 750 that allows for selection of a playlist, this example depicting "SENT RECOMMENDATIONS" playlist. For example, playlist selection menu 750 can be a drop down menu that includes a list of the playlists previously created. User interface 705 also includes a playlist area 752 that shows content that is currently in the playlist selected in playlist selection menu 750. In this non-limiting example, playlist area 752 shows "Shark Video . . . Birthday Video" currently in "SENT RECOMMENDATIONS" playlist. Column 754 indicates the recommended content in each row of the playlist. Column 756 indicates the recipient user persona for the recommended content in each row of the playlist. Column 758 indicates the source associated with sending user persona for the recommended content in each row of the playlist. Column 760 indicates the type of content for the recommended content in each row of the playlist. Column 762 indicates the rating assigned to the recommended content in each row of the playlist by the recipient user persona. It is to be appreciated columns 754, 756, 758, 760, and 762 are non-limiting examples of metadata associated with recommended content, and that any suitable metadata associated with the recommended content can be shown with the recommended content in playlist area 752.

Furthermore, user interface 705 can have controls (not shown) that allow sending user persona to sort and filter the recommended content. For example, columns 754, 756, 758, 760, and 762 can have controls (not shown) that allow sending user persona to select one or more columns, and specify order, and ascending/descending for sorting the recommended content. In another example, user interface 705 can have controls (not shown) that allow a recipient user persona to specify recommendations with certain recipient user personas, sources, content types, or ratings to include or exclude from the displayed playlist. Any suitable controls for sorting and filtering can be employed by user interface 705. Furthermore, user interface 705 can be configured, organized, or displayed in any suitable manner for presenting playlists based upon pre-determined, dynamically determined, or user specified criteria.

It is to be understood that FIGS. 4A, 4B, 4C, 4D, 4E, 6A, 6B, and 7 are non-limiting examples of user interfaces and that any suitable user interface or mechanism can be employed to allow for interactions with content, recommendations, and playlists.

It is further to be appreciated that while received recommendation component 120 and recommendation nudge component 130 are depicted on server 110, all of portions of received recommendation component 120 can reside on recipient device 160, and all or portions of recommendation nudge component 130 can reside on sender device 170.

Figure 8:
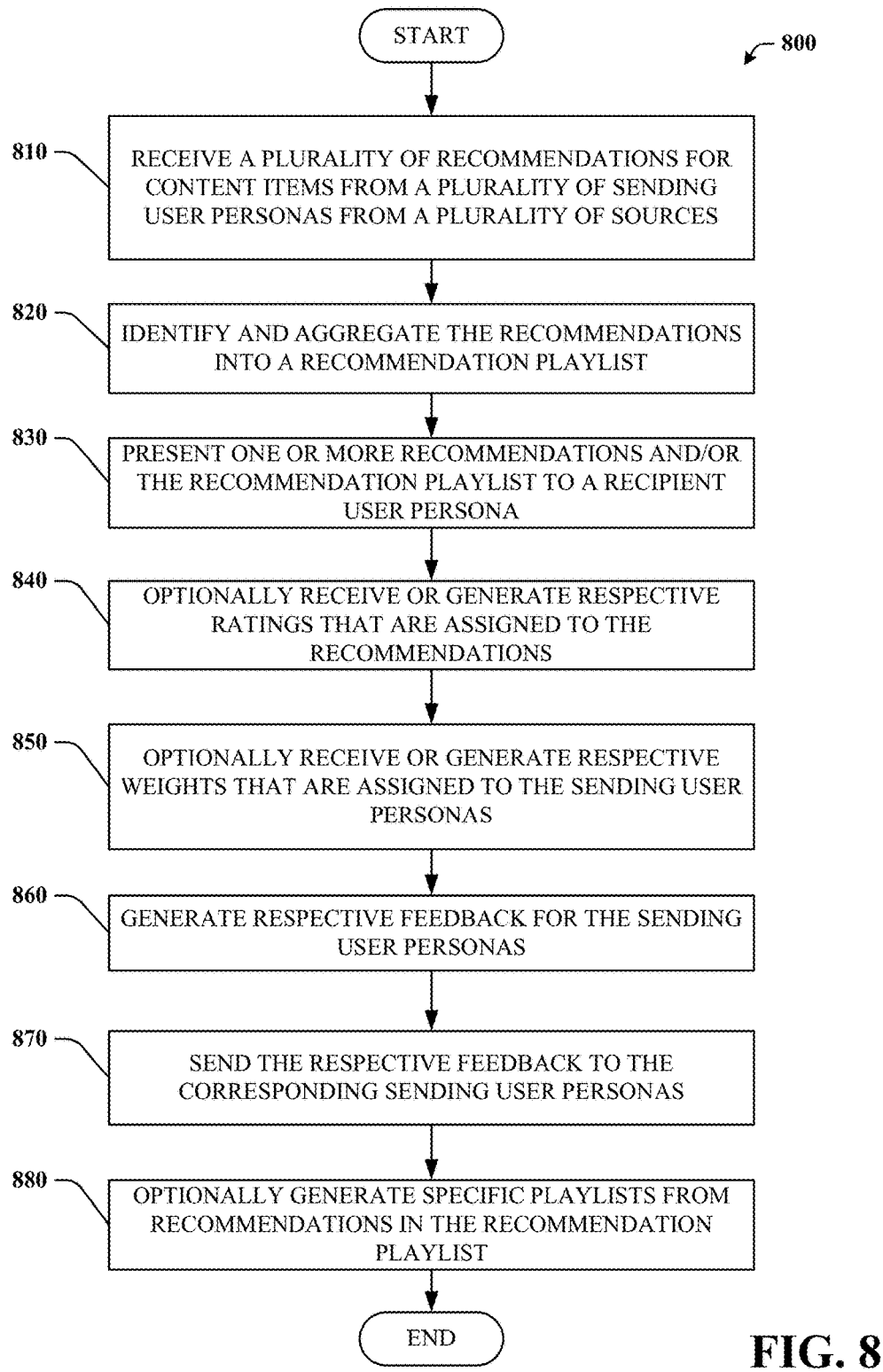
FIG. 8 illustrates an exemplary non-limiting flow diagram for receiving a plurality of recommendations for content directed to a recipient user persona from a plurality of sending user personas from a plurality of sources, and aggregating the recommendations into a recommendation playlist(s) for the recipient user persona, as well as send feedback to the sending user personas indicating quality of their recommendations in accordance with an implementation of this disclosure.
Figure 9:
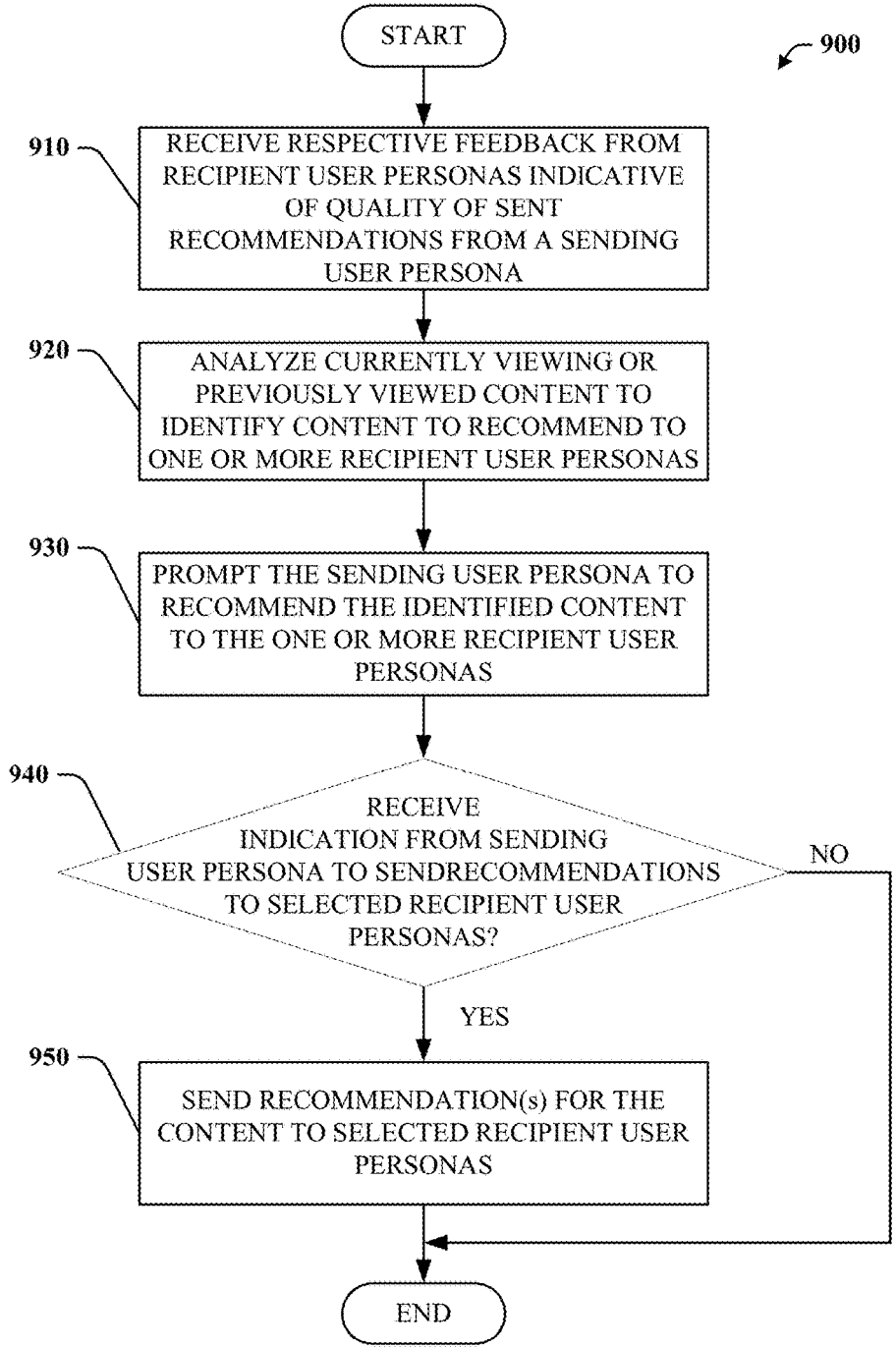
FIG. 9 illustrates an exemplary non-limiting flow diagram for prompting a sending user persona to send recommendations to recipient user personas in accordance with an implementation of this disclosure.
Figure 10:
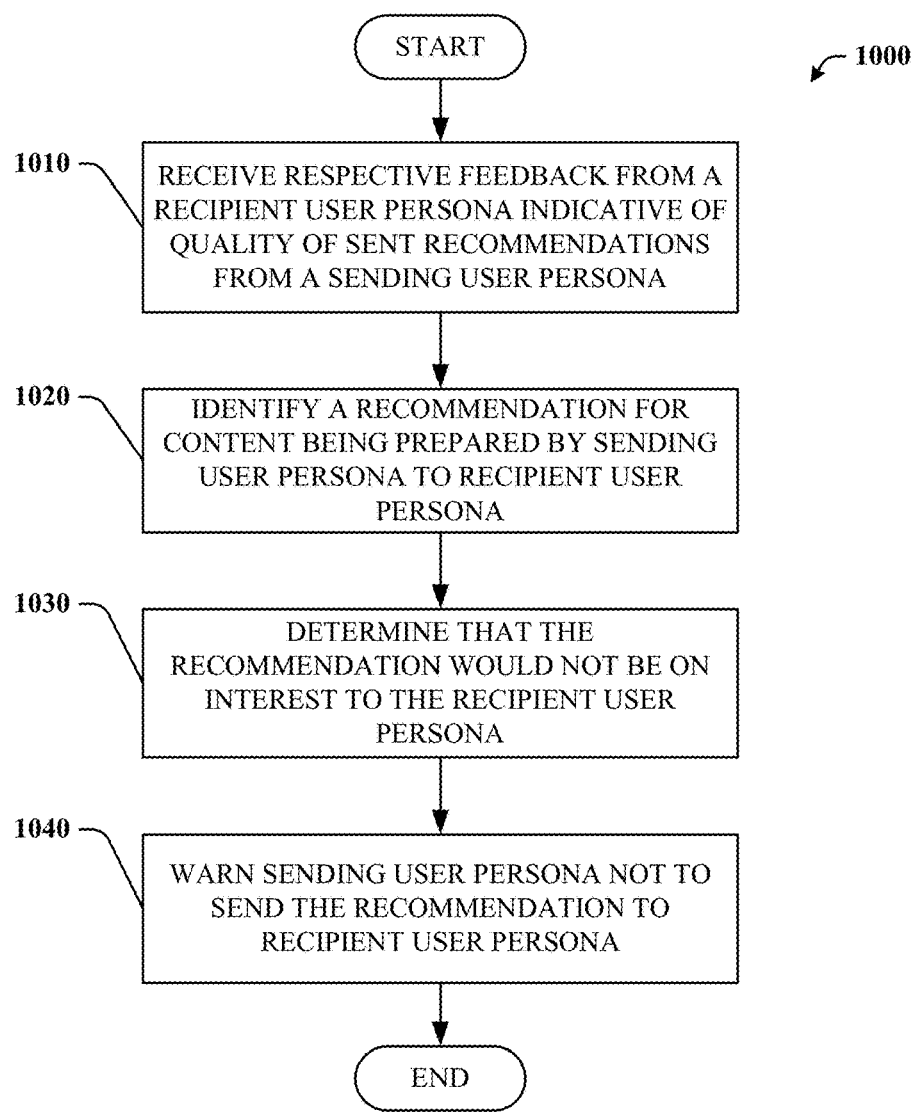
FIG. 10 illustrates an exemplary non-limiting flow diagram for warning a sending user persona not to send a recommendation to a recipient user persona in accordance with an implementation of this disclosure.

FIGS. 8-10 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 8 depicts an exemplary method 800 for receiving a plurality of recommendations for content directed to a recipient user persona from a plurality of sending user personas from a plurality of sources, and aggregating the recommendations into a recommendation playlist(s) for the recipient user persona, as well as send feedback to the sending user personas indicating quality of their recommendations. At reference numeral 810, a plurality of recommendations for content directed to a recipient user persona from a plurality of sending user personas from a plurality of sources is received (e.g., by an aggregation component 210, received recommendation component 120, server 110, or recipient device 160). At reference numeral 820, recommendations are determined, identified, or inferred and aggregated into a recommendation playlist (e.g., by an aggregation component 210, received recommendation component 120, server 110, or recipient device 160). At reference numeral 830, one or more recommendation and/or the recommendation playlist are presented to the recipient user persona (e.g., by a presentation component 220, received recommendation component 120 server 110, or recipient device 160). At reference numeral 840, optionally, respective ratings assigned to the recommendations by the recipient user persona or automatically generated are received (e.g., by a rating entry component 310, auto-rating component 320, rating component 230, received recommendation component 120 server 110, or recipient device 160). At reference numeral 850, optionally, respective weights assigned to the sending user personas by the recipient user persona or automatically generated are received (e.g., by a weight entry component 330, auto-weight component 340, rating component 230, received recommendation component 120 server 110, or recipient device 160). At reference numeral 860, respective feedback for the sending user personas is generated (e.g., by a feedback component 350, rating component 230, received recommendation component 120 server 110, or recipient device 160). At reference numeral 870, the respective feedback is sent to the corresponding sending user personas (e.g., by a feedback component 350, rating component 230, received recommendation component 120 server 110, or recipient device 160). At reference numeral 880, optionally, additional specific playlists are generated from recommendations in the recommendation playlist (e.g., by a sub-playlist component 240, received recommendation component 120 server 110, or recipient device 160).

FIG. 9 depicts an exemplary method 900 for prompting a sending user persona to send recommendations to recipient user personas. At reference numeral 910, respective feedback to a sending user persona from a plurality recipient user personas is received indicating quality of recommendations sent to the recipient user personas (e.g., by a received feedback component 510, recommendation nudge component 130, server 110, or sender device 170). At reference numeral 920, content currently being viewed or previously viewed by the sending user persona is analyzed to identify content to recommend to one or more recipient user personas (e.g., by a content analysis component 520, recommendation nudge component 130, server 110, or sender device 170). At reference numeral 930, the sending user persona is prompted to recommend the identified content to the one or more recipient user personas (e.g., by a content analysis component 520, recommendation nudge component 130, server 110, or sender device 170). At reference numeral 940, a determination is made whether the sending user persona has provided an indication to send recommendations for the identified content to selected recipient user personas (e.g., by a content analysis component 520, recommendation nudge component 130, server 110, or sender device 170). If the determination at 940 is "NO" meaning that a determination has been made that the sending user persona has provided an indication not to send recommendations for the identified content to the one or more user recipient personas, the method ends. If the determination at 940 is "YES" meaning that a determination has been made that the sending user persona has provided an indication to send recommendations for the identified content to selected recipient user personas, the method proceeds to reference numeral 950. At reference numeral 950, the recommendations for the identified content are sent to the selected recipient user personas (e.g., by a content analysis component 520, recommendation nudge component 130, server 110, or sender device 170).

FIG. 10 depicts an exemplary method 1000 for warning a sending user persona not to send a recommendation to a recipient user persona. At reference numeral 1010, respective feedback to a sending user persona from a recipient user persona is received indicating quality of recommendations sent to the recipient user persona (e.g., by a received feedback component 510, recommendation nudge component 130, server 110, or sender device 170). At reference numeral 1020, a recommendation currently being prepared by sending user persona to send to a recipient user persona is identified (e.g., by a content analysis component 520, recommendation nudge component 130, server 110, or sender device 170). At reference numeral 1030, a determination or inference is made that the recommendation currently being prepared by sending user persona would not be of interest to the recipient user persona (e.g., by a content analysis component 520, recommendation nudge component 130, server 110, or sender device 170). At reference numeral 1040, a warning is presented to the sending user persona not to send the recommendation to the recipient user persona (e.g., by a content analysis component 520, recommendation nudge component 130, server 110, or sender device 170).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 11:
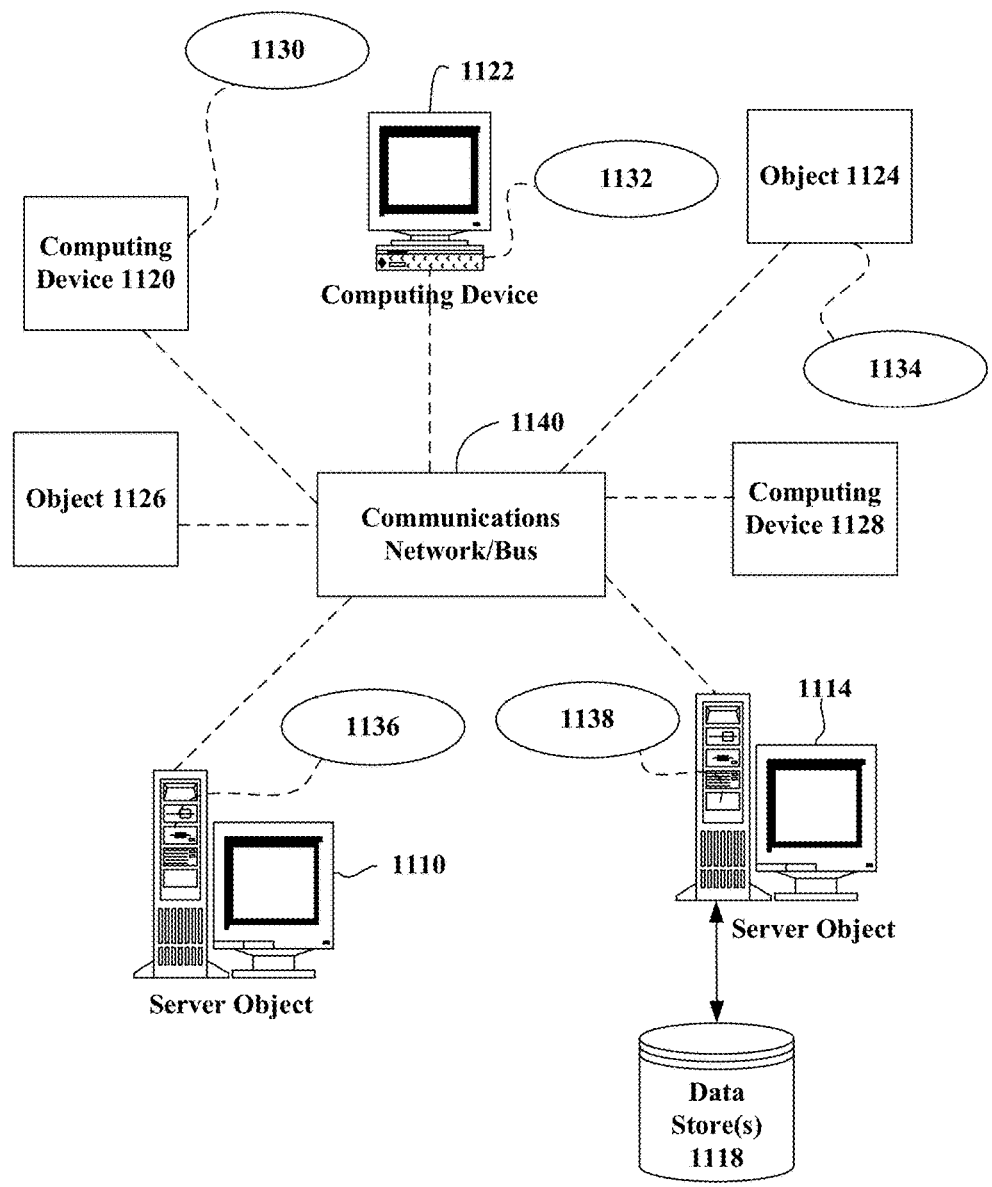
FIG. 11 illustrates a block diagram of an exemplary non-limiting networked environment in which various embodiments can be implemented.

FIG. 11 provides a schematic diagram of an exemplary networked or distributed computing environment. The distributed computing environment comprises computing objects 1110, 1114, etc. and computing objects or devices 1118, 1120, 1122, 1124, 1126, 1128, etc., which may include programs, methods, data stores, programmable logic, etc., as represented by applications 1130, 1132, 1134, 1136, 1138. It can be appreciated that computing objects 1110, 1114, etc. and computing objects or devices 1118, 1120, 1122, 1124, 1126, 1128, etc. may comprise different devices, such as personal digital assistants (PDAs), audio/video devices, mobile phones, MP3 players, personal computers, laptops, tablets, etc.

Each computing object 1110, 1114, etc. and computing objects or devices 1118, 1120, 1122, 1124, 1126, 1128, etc. can communicate with one or more other computing objects 1110, 1114, etc. and computing objects or devices 1118, 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1114, etc. or computing objects or devices 1118, 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 11, as a non-limiting example, computing objects or devices 1118, 1120, 1122, 1124, 1126, 1128, etc. can be thought of as clients and computing objects 1110, 1114, etc. can be thought of as servers where computing objects 1110, 1114, etc. provide data services, such as receiving data from client computing objects or devices 1118, 1120, 1122, 1124, 1126, 1128, etc., storing of data, processing of data, transmitting data to client computing objects or devices 1118, 1120, 1122, 1124, 1126, 1128, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1140 is the Internet, for example, the computing objects 1110, 1114, etc. can be Web servers, file servers, media servers, etc. with which the client computing objects or devices 1118, 1120, 1122, 1124, 1126, 1128, etc. communicate via any of a number of known protocols, such as the hypertext transfer protocol (HTTP). Objects 1110, 1114, etc. may also serve as client computing objects or devices 1118, 1120, 1122, 1124, 1126, 1128, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 12 is but one example of a computing device that can be employed with implementing one or more of the systems or methods shown and described in connection with FIGS. 1-10. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 be interpreted as having any dependency or requirement relating to any one or combination of components illustrated in the exemplary operating environment 1200.

With reference to FIG. 12, an exemplary computing device for implementing one or more embodiments in the form of a computer 1210 is depicted. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data.

A user can enter commands and information into the computer 1210 through input devices 1240, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1210. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270 via network interface 1260. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:
receiving a plurality of recommendations for content items from a plurality of sending users for a recipient user through a plurality of sources;
selecting, for the recipient user, a subset of the plurality of recommendations for content items that is pertinent to the recipient user, wherein the selecting comprises:
determining that the recipient user is interested in viewing recommendations for content items from a first sending user of the plurality of sending users based on interactions by the recipient user with prior recommendations for content items from the first sending user; and
determining the subset of the plurality of recommendations for content items that has originated from the first sending user; and
generating, by a processing device, a first sending user playlist for the recipient user, the first sending user playlist including the subset of the plurality of recommendations for content items from the first sending user but not from other sending users of the plurality of sending users.

2. The method of claim 1 further comprising adding the plurality of recommendations for content items to a received recommendations playlist associated with the recipient user.

3. The method of claim 1 wherein determining that the recipient user is interested in viewing the recommendations for content items from the first sending user of the plurality of sending users comprises determining that a number of positive interactions by the recipient user with the prior recommendations from the first sending user satisfies one or more interaction criteria.

4. The method of claim 3 wherein the interaction criteria comprise a threshold quantity of interactions.

5. The method of claim 1, further comprising sending at least one rating to at least one sending user of the plurality of sending users for at least one of the plurality of recommendations for content items, the at least one rating being indicative of quality of the at least one recommendation.

6. The method of claim 5, further comprising:
ranking the plurality of recommendations for content items based upon the at least one rating; and
sorting the plurality of recommendations for content items according to their respective rankings.

7. The method of claim 1, wherein the plurality of recommendations for content items are received via a plurality of sources associated with the recipient user.

8. The method of claim 7, wherein the plurality of sources comprise at least two of an email, a text message, an instant message, a chat message, a wall post, a social network post, a social network message, a voicemail, a video message, an audio message, a photo message, a comment on a post, a blog post, a newsletter, a pop-up window, a content site share, a phone call, a conference call, an optical character recognition of a handwritten or printed note, a voice recognition of a live or recorded conversation, a near field communication, a Bluetooth communication, a Bump, a cloud drive share, or a shared playlist.

9. A system, comprising:
a memory; and
a processor, coupled to the memory, to:
receive a plurality of recommendations for content items from a plurality of sending users for a recipient user through a plurality of sources;
select, for the recipient user, a subset of the plurality of recommendations for content items that is pertinent to the recipient user, wherein to select the subset of the plurality of recommendations, the processor to:
determine that the recipient user is interested in viewing recommendations for content items from a first sending user of the plurality of sending users based on positive interactions by the recipient user with prior recommendations for content items from the first sending user; and
determine the subset of the plurality of recommendations for content items that has originated from the first sending user; and
generate a first sending user playlist for the recipient user, the first sending user playlist including the subset of the plurality of recommendations for content items from the first sending user but not from other sending users of the plurality of sending users.

10. The system of claim 9 wherein the processor is further to add recommendations for content items to a received recommendations playlist associated with the recipient user.

11. The system of claim 9 wherein to determine that the recipient user is interested in viewing the recommendations for content items from the first sending user of the plurality of sending users, the processor is to determine that a number of positive interactions by the recipient user with the prior recommendations from the first sending user satisfies one or more interaction criteria.

12. The system of claim 11 wherein the interaction criteria comprise a threshold quantity of interactions.

13. The system of claim 9, wherein the processor is further to send at least one rating to at least one sending user of the plurality of sending users for at least one of recommendations for content items, the at least one rating being indicative of quality of the at least one recommendation.

14. The system of claim 13, wherein the processor is further to:
rank the plurality of recommendations for content items based upon the at least one rating; and
sort the plurality of recommendations for content items according to their respective rankings.

15. The system of claim 9, wherein the plurality of recommendations for content items are received via a plurality of sources associated with the recipient user.

16. The system of claim 15, wherein the plurality of sources comprise at least two of an email, a text message, an instant message, a chat message, a wall post, a social network post, a social network message, a voicemail, a video message, an audio message, a photo message, a comment on a post, a blog post, a newsletter, a pop-up window, a content site share, a phone call, a conference call, an optical character recognition of a handwritten or printed note, a voice recognition of a live or recorded conversation, a near field communication, a Bluetooth communication, a Bump, a cloud drive share, or a shared playlist.

17. A non-transitory computer-readable medium comprising instructions that, when executed by a processor, cause the processor to perform operations comprising:
receiving a plurality of recommendations for content items from a plurality of sending users for a recipient user through a plurality of sources;
selecting, for the recipient user, a subset of the plurality of recommendations for content items that is pertinent to the recipient user, wherein the selecting comprises:
determining that the recipient user is interested in viewing recommendations for content items from a first sending user of the plurality of sending users based on positive interactions by the recipient user with prior recommendations for content items from the first sending user; and
determining the subset of the plurality of recommendations for content items that has originated from the first sending user; and
generating a first sending user playlist for the recipient user, the first sending user playlist including the subset of recommendations for content items from the first sending user but not from other sending users of the plurality of sending users.

18. The non-transitory computer-readable medium of claim 17 wherein the operations further comprise adding the plurality of recommendations for content items to a received recommendations playlist associated with the recipient user.

19. The non-transitory computer-readable medium of claim 17 wherein determining that the recipient user is interested in viewing the recommendations for content items from the first sending user of the plurality of sending users comprises determining that a number of positive interactions by the recipient user with the prior recommendations from the first sending user satisfies one or more interaction criteria.

20. The non-transitory computer-readable medium of claim 19 wherein the interaction criteria comprise a threshold quantity of interactions.

* * * * *